United States Patent [19]

Dartnall

[11] Patent Number: 5,152,537

[45] Date of Patent: Oct. 6, 1992

[54] SEAL

[75] Inventor: William J. Dartnall, Perth, Australia

[73] Assignee: Dartnall Engineering & Innovation Pty. Ltd., Australia

[21] Appl. No.: 536,652

[22] PCT Filed: Dec. 30, 1988

[86] PCT No.: PCT/AU88/00504

§ 371 Date: Jul. 10, 1990

§ 102(e) Date: Jul. 10, 1990

[87] PCT Pub. No.: WO89/06762

PCT Pub. Date: Jul. 27, 1989

[30] Foreign Application Priority Data

Jan. 12, 1988 [AU] Australia .................. PI6265
Sep. 20, 1988 [AU] Australia .................. PJ0533

[51] Int. Cl.$^5$ ............................ F16J 15/24
[52] U.S. Cl. ........................ 277/4; 277/102; 277/125; 277/165; 277/203
[58] Field of Search .......... 277/4, 207 A, 102, 64, 277/123, 125, 165, 196, 186, 203

[56] References Cited

U.S. PATENT DOCUMENTS

| 487,019 | 11/1892 | Knowlton | 277/203 |
|---|---|---|---|
| 1,700,568 | 1/1929 | Gray | 277/203 X |
| 1,912,408 | 6/1933 | Schelhammer | 277/64 X |
| 2,064,235 | 12/1936 | Wheller | 277/203 |
| 2,126,007 | 8/1938 | Guiberson et al. | 277/123 X |
| 2,420,721 | 5/1947 | Pennella | 277/102 X |
| 2,444,211 | 6/1948 | Wager | 277/4 |
| 2,542,593 | 2/1951 | Sullivan | 277/203 X |
| 3,164,388 | 1/1965 | Ellis | 277/203 X |
| 3,442,518 | 5/1969 | Henshaw | 277/203 |
| 3,529,836 | 9/1970 | Hyde | 277/203 X |
| 3,608,912 | 9/1971 | Templin | 277/123 |
| 3,647,245 | 3/1972 | Hanes et al. | 285/110 |
| 3,874,679 | 4/1975 | Kaller | 277/165 X |
| 4,239,245 | 12/1980 | Giglio et al. | 277/203 |
| 4,608,739 | 9/1986 | Miller . | |
| 4,717,160 | 1/1988 | Zitting et al. | 277/102 X |
| 4,789,168 | 12/1988 | Daume | 277/125 X |
| 4,844,479 | 7/1989 | Ueda et al. | 277/4 |

FOREIGN PATENT DOCUMENTS

| 20421 | 3/1972 | Australia . | |
|---|---|---|---|
| 565520 | 1/1924 | France | 277/203 |
| 1304195 | 8/1962 | France | 277/125 |
| 1542641 | 2/1969 | France . | |
| 603697 | 4/1960 | Italy | 277/125 |
| 448649 | 4/1968 | Switzerland | 277/125 |
| 471341 | 9/1937 | United Kingdom | 277/165 |
| 804457 | 11/1958 | United Kingdom | 277/102 |

Primary Examiner—William A. Cuchlinski, Jr.
Assistant Examiner—Scott W. Cummings
Attorney, Agent, or Firm—Harness, Dickey & Pierce

[57] ABSTRACT

A seal to be used between a pair of elements and capable of relative slidable movement with respect to each other. The seal having the configuration of a helix having a length in excess of one revolution of the helix and being supported from one element and slidably engaged with the other element. Means being provided to cause compression of the seal axially and compression of the seal radially against the other element.

14 Claims, 5 Drawing Sheets

SEAL

BACKGROUND OF THE INVENTION

The seal according to the invention has particular application for use between two components which are capable of relative slidable movement with respect to each other. It has been recognised by the inventor that it is a requirement of such seals that they not only be resiliently flexible in order to be able to maintain intimate surface contact with one of the surfaces but that they also have a relatively low coefficient of sliding friction with the surface with which they are in contact and that they be wear resistant. In the past it has been found not to be possible to have all of these properties in a single element and therefore a number of compromises have to be met in order to achieve a satisfactory result.

It is an object of this invention to provide a seal which is able to maintain close intimate contact with a surface with which it is to be held in sealing engagement, has a relatively low coefficient of sliding friction and is durable.

SUMMARY OF THE INVENTION

In one form the invention resides in a seal for use between a pair of substantially concentric elements capable of relative movement with respect to each other said seal comprising a sealing element having the configuration of a helix and having a length in excess of one revolution of said helix wherein the opposed axial faces of the helix are of complementary configuration and are in close abutting relationship with each other said sealing element being formed of a rigid resilient wear resistant material having a low coefficient of sliding friction said sealing element being adapted to be supported from one element by a support means and being in close abutting relationship with the other element said support means including a clamping means for causing resilient compression of the seal axially and radially against the other element.

Throughout this specification and claims the term tube or tubular shall not be taken as being restricted to instances where the components are of a circular cross-section or where the inner and outer surfaces are of similar cross-sectional configuration.

BRIEF DESCRIPTION OF THE DRAWINGS

The invention will be more fully understood in the light of the following description of several specific embodiments. The description is made with reference to the accompanying drawings of which.

DETAILED DESCRIPTION OF THE PREFERRED EMBODIMENTS OF THE INVENTION

Figure 1:
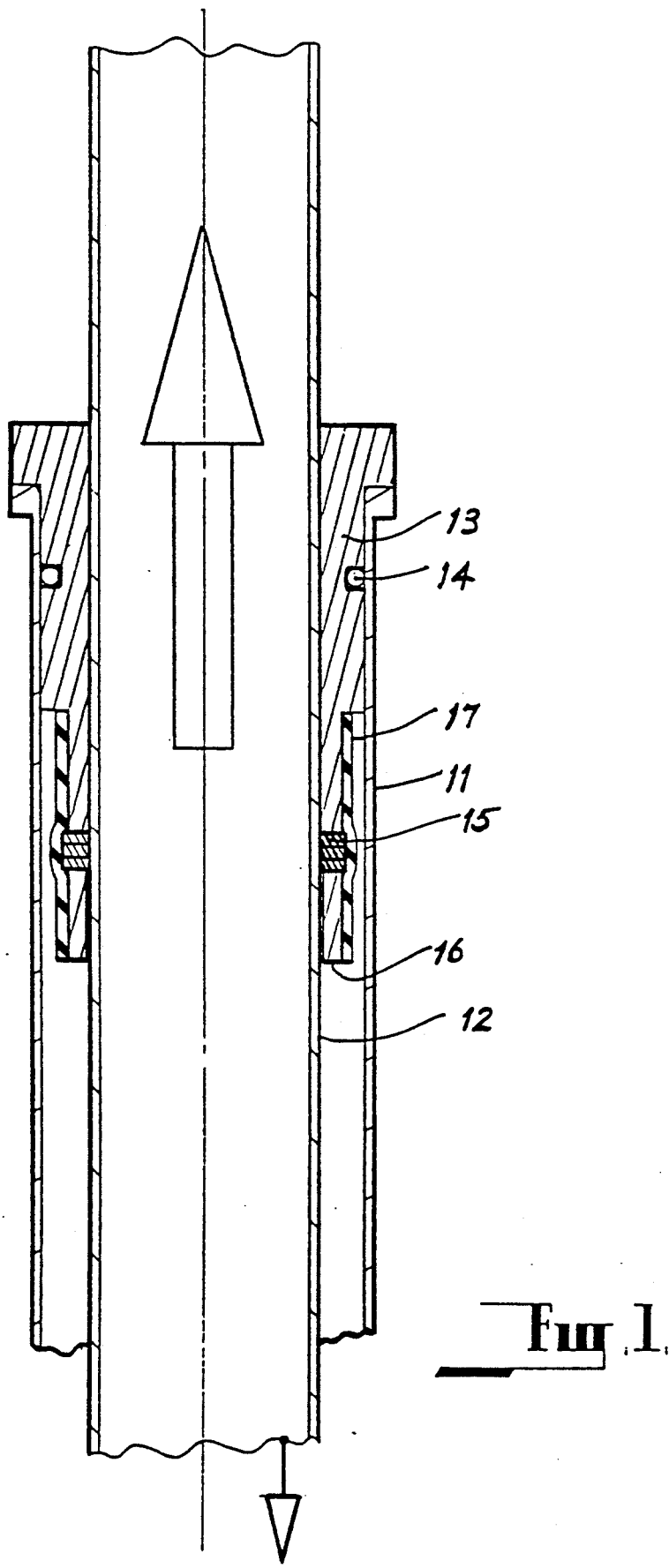
FIG. 1 is a sectional elevation of a first embodiment.

The first embodiment as shown in FIG. 1 relates to a seal which is used between a pair of concentric tubes 11 and 12 wherein the inner tube 12 is capable of slidable movement with respect to the outer tube 11. The inner tube 12 is supported in the outer tube 11 by a seal housing 13 which is received in one end of the outer tube 11 and is received concentrically between the inner tube 12 and outer tube 11. An O ring seal 14 is provided between the inner face of the outer tube 11 and the exterior face of the seal housing 13. The inner portion of the seal housing 13 is formed with a reduced diameter portion whereby the exterior face of the reduced diameter portion is spaced from the internal face of the outer tube 11. To seal the interface between the exterior face of the inner tube 12 and the seal housing 13 a seal 15 is utilised. As shown the seal 15 comprises a helix having at least one revolution. It is formed of a wear resistant resilient material which has a low co-efficient of sliding friction with the surface of the inner tube. In addition the wall thickness of the seal is greater than the reduced diameter portion of the seal housing 13 and the internal diameter of the seal in its unstressed position is less than the external diameter of the inner tube 12. The seal is received over the outer surface of the inner tube 12 and is held in abuttment with the inner edge of the seal housing 13. The seal is associated with an annular bush 16 which is located to the opposite side of the seal from the inner end of the seal housing 13 such that the seal is retained between the seal housing 13 and the bush 16. To retain the seal 15 and bush 16 in position relative to the seal housing a flexible resilient tubular element 17 formed of an elastomeric material such as neoprene or rubber is applied over the reduced diameter portion of the seal housing 13, the seal 15 and the bush 16. The flexible resilient tubular element 17 surrounds the seal radially and extends axially to each side thereof and applies a radial force onto the seal against this inner tube 11. In order to locate the seal over the inner tube 12 it is necessary that it be expanded radially and as a result the seal is resiliently biased into engagement with the tube. Since the wall thickness of the seal is greater than that of the reduced diameter portion of the seal housing and the bush, the seal is further biased into engagement with the outer surface of the inner tube due to the radial deformation caused in the tubular element 17. In addition the tubular element serves to prevent axial displacement of the bush 16 and axial expansion of the seal 15. Furthermore on application of the tubular element 17 it is stretched axially such as to provide a biassing force onto the seal 15 to prevent axial expansion thereof. During slidable movement of the inner tube 12 within the outer tube 11 any pressure that is generated in the space between the inner and outer tubes 11 and 12 will be exerted on the exterior face of the resilient tubular element 17 which will further serve to bias the seal 15 into engagement with the outer surface of the inner tube 12 and thus enhance the sealing action. Such sealing action furthermore would occur at a time when such greater sealing is required (i.e. during increased pressure conditions). The axial compression of the seal effected through the tubular element 17 serves to prevent fluid flow along the interface between the turns of the helix.

Figures 2, 3:
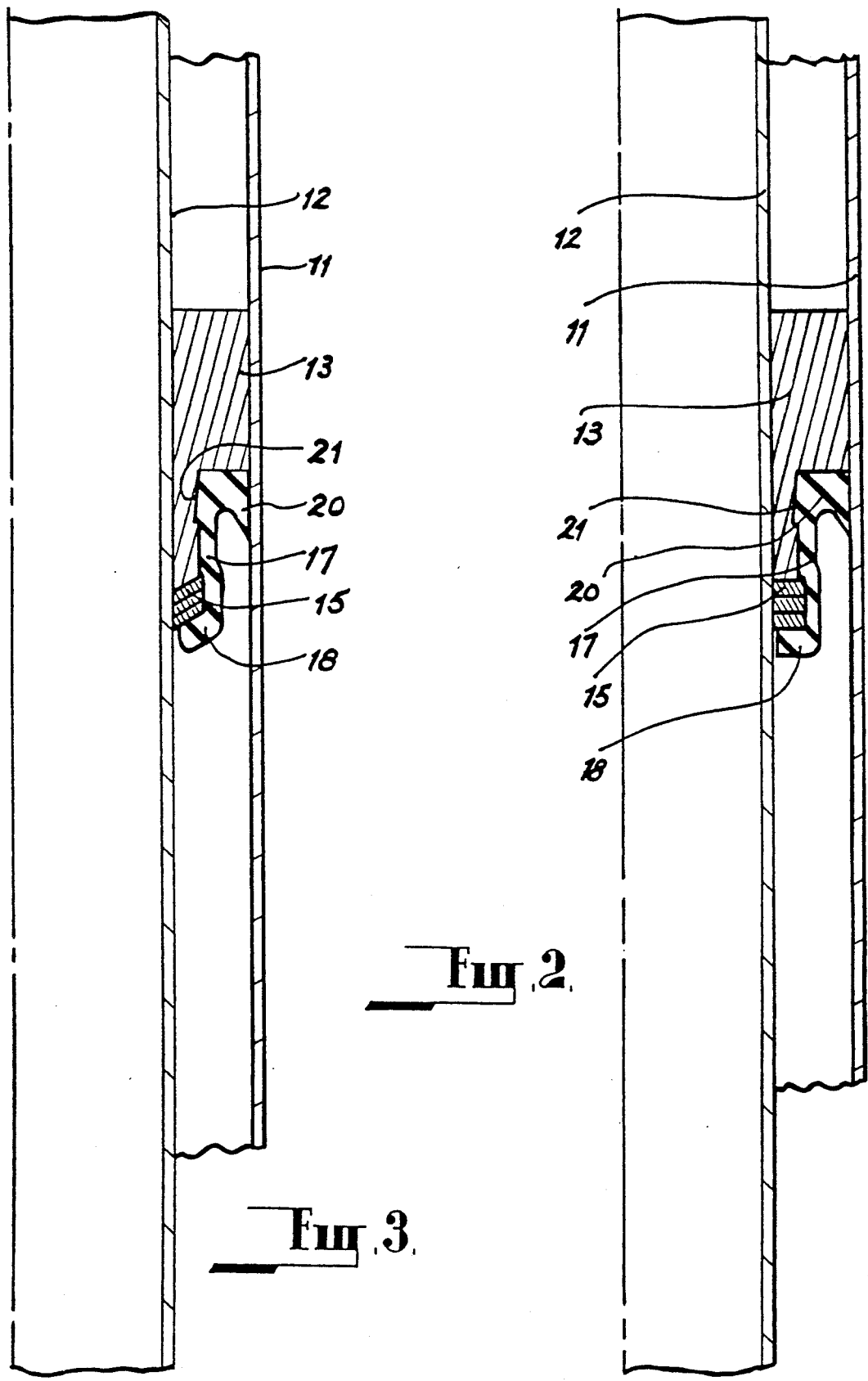
FIG. 2 is a part section elevation of a second embodiment.
FIG. 3 is a part sectional elevation of a third embodiment.

The second embodiment as shown at FIG. 2 is similar to the first embodiment and identical reference numerals have been used to identify similar components. The difference between the first and second embodiments resides in the nature of the tubular element 17 which is provided with a lip seal 20 at its outer end for engagement with the inner face of the outer tube 11 in replacement of the O ring seal 14 of the first embodiment. In addition the reduced diameter portion of the seal housing 13 is recessed at an intermediate portion 21 to positively locate the tubular element 17. Furthermore the bush 16 is replaced by an inwardly directed flange 18 at the outer end of the tubular element 17.

The third embodiment as shown at FIG. 3 is similar to the second embodiment in which the only variation comprises the configuration of the seal 15 and the flange 18 of the tubular element. The seal is formed such that its axial faces are inclined to the central axis of the seal whereby when in position the axial faces are inclined to the external face of the inner tube 11 in the direction of the inward movement of the inner tube 11 into the outer tube 12 and the flange 18 of the tubular element 17 has a complementary configuration.

Figure 4:
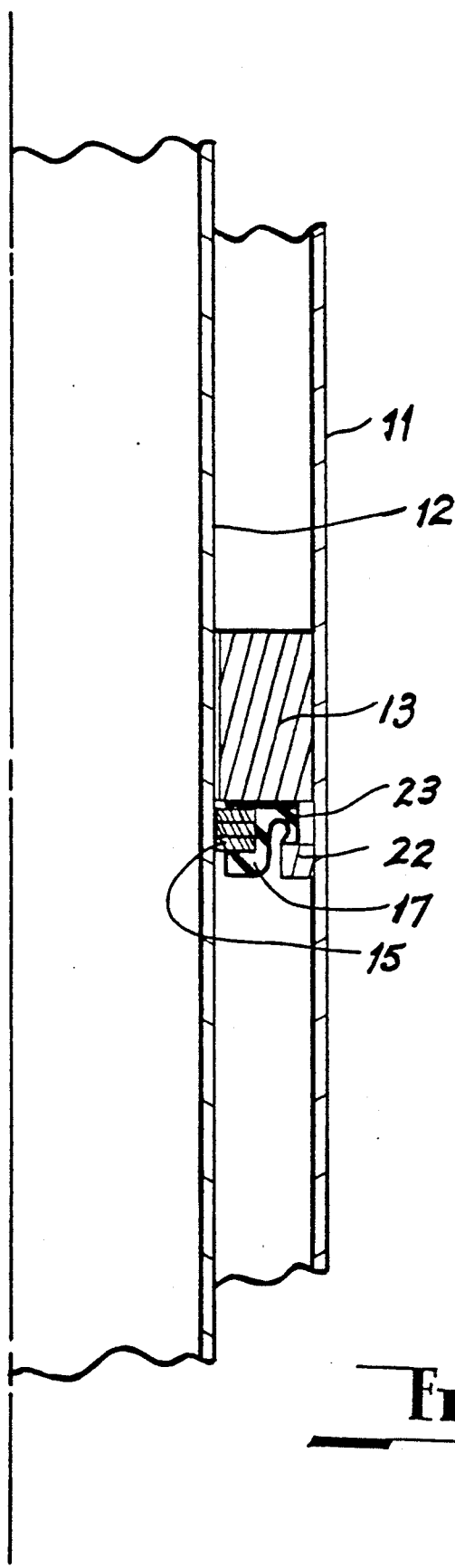
FIG. 4 is a sectional elevation of a fourth embodiment.

The fourth embodiment as shown at FIG. 4 is a further variation of the second and third embodiments whereby the seal housing 13 is not formed with a reduced diameter portion and the seal and tubular element 17 are in abutting face to face engagement with the inner end of the seal housing 13. In addition the seal housing is associated with a retaining ring 22 which is supported on the internal face of the outer tube 11 and in closely spaced in relation to the inner end of the seal housing 13. The tubular element 17 is formed with a flange seal 23 which is sealingly engaged between the inner end of the seal housing 13 and the retaining ring 22. The seal 15 and the tubular element 17 are floatingly supported from between the seal housing 13 and the retaining ring 22 to be capable of relative radial movement therebetween whereby on any radial movement of the inner tube 12 within the outer tube 11 such movement can be accommodated for by seal without the degeneration of the sealing contact between the two surfaces.

Figure 5:
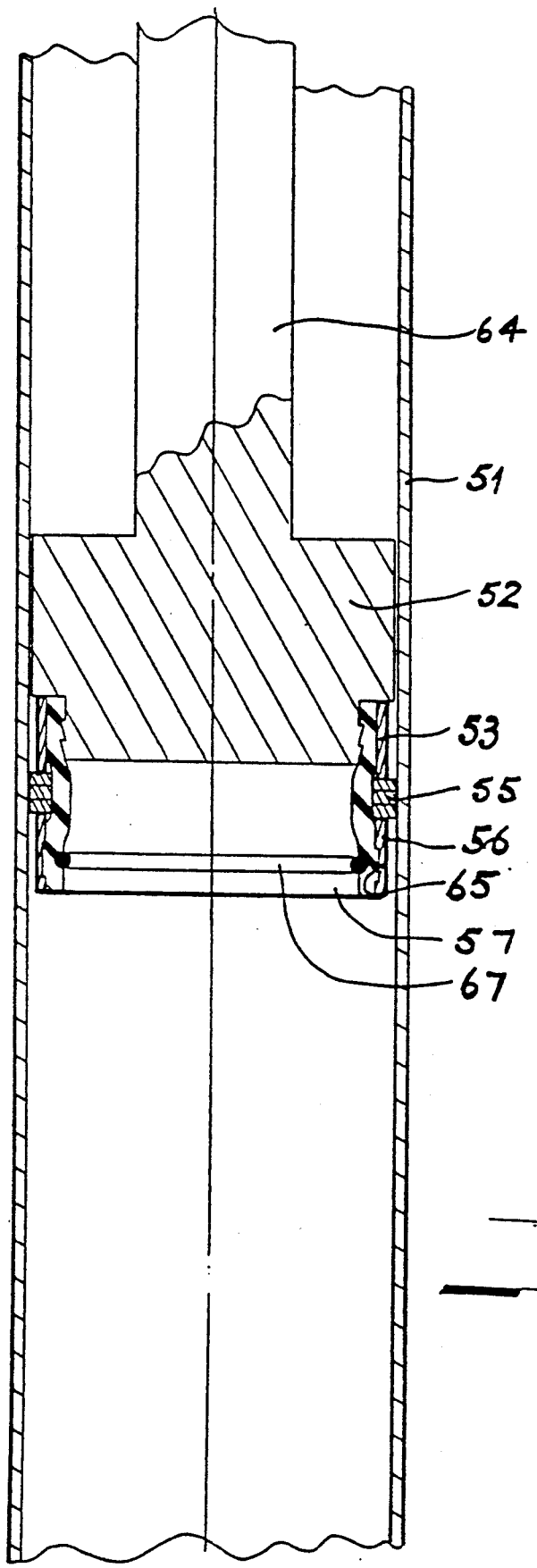
FIG. 5 is a sectional elevation of a fifth embodiment

In the case of the fifth embodiment as shown at FIG. 5 the sealing arrangement of the embodiment comprises one where the seal is applied to the internal face of a tubular member. An example of the embodiment comprises a seal provided on a piston 52 which is received within a cylinder body 51 whereby the piston 52 is supported on the end of a piston rod 64. The piston is formed at its inner end with a reduced diameter portion which supports a flexible resilient tubular element 57 which is formed of an elastomeric material such as neoprene or rubber. The tubular element 57 is retained on the reduced diameter portion of the piston 52 by being engaged in a plurality of recesses 61 provided on the reduced diameter portion. Associated with the tubular element is a support ring 53 which is concentrically received over the tubular element 57 to overlie the portion received over the reduced diameter portion of the piston 52. A seal 55 of similar form to the previous embodiments is received over the tubular element 57 adjacent the innermost edge of the support ring 53. The seal has a wall thickness which is greater than that of the support ring 53 and has an external diameter which is greater than the internal diameter of the cylinder body 51 such that it must be compressed in order to be located within the cylinder body 51. The seal 55 is retained in position by an annular bush 56 which is received over the tubular element 57. The inner face of the annular bush 56 is formed with a groove and the inner face of the tubular element 57 in the region opposite that recess 65 accommodates a resilient circlip 67 which serves to engage the tubular element 57 with the annular bush 56 to prevent axial displacement of the annular bush 56 with respect to the tubular element 57. As a result of the relative wall thicknesses of the seal with respect to the tubular wall thicknesses of the support 53 and the annular bush 56, the tubular element 57 is caused to be deformed radially inwardly by the seal 55 which further serves to bias the seal 55 outwardly against the inner face of the cylinder body 51. Furthermore during use increased pressure generated within the cylinder body 51 would be exerted on the internal face of the tubular band 57 to further bias the seal in sealing engagement with the inner face of the cylinder body 51.

Figure 6A:
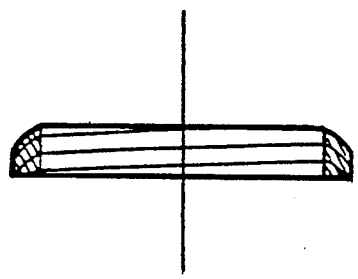
FIGS. 6a, 6b and 6c are sectional elevations of various seals which can be used in each of the embodiments.
Figure 6B:
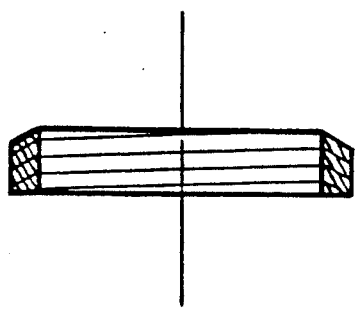
Figure 6C:
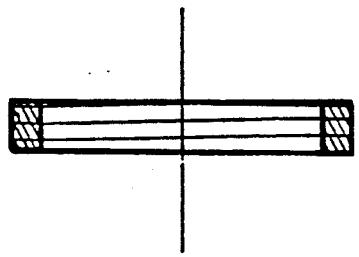

As shown at FIGS. 6a,b and c the seal which can be used in each of the embodiments described above may take a variety of configurations depending upon the configuration of the spaces in which the seal is to be located. In addition there can be an advantage in inclining the axial faces of the helix in respect to the central axis of the seal in order to improve the flexibility characteristics of the seal.

In addition the helix may be formed as a part of the seal housing of each of the embodiments described above.

It is desired the seal of the invention need not be limited to use where the other element is of constant cross-section but has application where the other element is tapered or is of irregular cross-section.

It should be appreciated that the scope of the present invention need not be limited to the particular scope of the embodiment described above.

I claim:

1. A seal for use between a pair of substantially concentric elements capable of relative movement with respect to each other, said seal comprising: a sealing element having the configuration of a helix and having a length in excess of one revolution of said helix wherein the opposed axial faces of the helix are of complementary configuration and are in close abutting relationship with each other, said sealing element being formed of a wear resistant material having a low coefficient of sliding friction, said sealing element being resiliently deformable both axially and radially, said sealing element being supported from one element by a support means and being in close abutting relationship with the other element, said support means including a clamping means, said clamping means including a resilient flexible tubular element extending over a radial face of said seal remote from the other element, said resilient flexible tubular element causing continuous resilient compression of the seal along its longitudinal direction inwardly from each axial end thereof and, also, radially in a direction against the other element.

2. A seal as claimed in claim 1 wherein said clamping means which includes said resiliently flexible tubular element which extends over the radial face of the sealing element remote from the other element extends to each side thereof.

3. A seal as claimed in claim 2 wherein said support means comprises a support element to each side of the sealing element and in close axial abutting relationship therewith whereby the clamping means overlies the sealing element and at least a portion of each support element.

4. A seal as claimed in claim 2 wherein said support means comprises a support element supported from said one element wherein said sealing element is located in close abutting axial relation with the support element and said tubular element is formed with a retention means for engaging the axial face of the sealing element remote from the support element.

5. A seal as claimed in claim 4 wherein said resilient tubular element is formed with a portion extending radially for sealing engagement with the one element.

6. A seal as claimed in claim 1 wherein the support means comprises a support element fixed to said one element wherein said sealing element is maintained in close abutting axial relationship with the support element and is capable of relative slidable movement radially with respect to the support element.

7. A seal as claimed in claim 6 wherein said clamping means comprises a resiliently flexible tubular member which extends over the radial face of the sealing element remote from the other element.

8. A seal as claimed at claim 7 wherein the tubular element is formed with a radially directed flange which engages the axial face of the sealing element remote from the support element.

9. A seal as claimed at claim 7 wherein a retaining ring is fixed to the one element at a position spaced axially from the support element and said tubular element is slidably supported between the support element and the retaining ring for said radial movement.

10. A seal as claimed in claim 1 wherein the internal face of said one element is of a substantially circular cross section and said other element is concentrically received therein.

11. A seal as claimed in claim 1 wherein said other element has an internal face which is of a substantially circular cross-section and said one element is concentrically received therein.

12. A seal as claimed in claim 1 wherein the axial faces of the helix are inclined to the central axis thereof.

13. A seal as claimed at claim 8 wherein a retaining ring is fixed to the one element at a position spaced axially from the support element and said tubular element is slidably supported between the support element and the retaining ring for said radial movement.

14. A seal for use between a pair of substantially concentric elements capable of relative movement with respect to each other, said seal comprising: a sealing element having the configuration of a helix and having a length in excess of one revolution of said helix wherein the opposed axial faces of the helix are of complementary configuration and are in close abutting relationship with each other, said sealing element being formed of a wear resistant material having a low coefficient of sliding friction, said sealing element being resiliently deformable both axially and radially, said sealing element being supported from one element by a support means and being in close abutting relationship with the other element, said support means including a clamping means, said clamping means including a resilient flexible tubular element extending over a radial face of said seal remote from the other element, said resilient flexible tubular element causing continuous resilient compression of the seal along its longitudinal direction inwardly from each axial end thereof and, also, radially in a direction against the other element; and wherein said support means comprises a support element to each side of the sealing element and in close axial abutting relationship therewith whereby the clamping means overlies the sealing element and at least a portion of each support element.

* * * * *